United States Patent
Cutforth et al.

(10) Patent No.: US 9,773,012 B2
(45) Date of Patent: Sep. 26, 2017

(54) UPDATING MAP STRUCTURES IN AN OBJECT STORAGE SYSTEM

(71) Applicant: Seagate Technology LLC, Cupertino, CA (US)

(72) Inventors: Craig F. Cutforth, Louisville, CO (US); Caroline W. Arnold, Broomfield, CO (US); Christopher J. DeMattio, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 883 days.

(21) Appl. No.: 14/075,831

(22) Filed: Nov. 8, 2013

(65) Prior Publication Data

US 2015/0134708 A1    May 14, 2015

(51) Int. Cl.
  *G06F 17/30* (2006.01)
  *G06F 3/06* (2006.01)

(52) U.S. Cl.
  CPC ........ *G06F 17/30194* (2013.01); *G06F 3/067* (2013.01); *G06F 3/0647* (2013.01); *G06F 17/30079* (2013.01); *G06F 17/30197* (2013.01)

(58) Field of Classification Search
  CPC ............. G06F 3/0647; G06F 17/30079; G06F 17/30194; G06F 17/30197
  See application file for complete search history.

(56) References Cited

U.S. PATENT DOCUMENTS

| | | | |
|---|---|---|---|
| 5,802,106 A | 9/1998 | Packer | |
| 6,115,357 A | 9/2000 | Packer et al. | |
| 7,200,141 B2 | 4/2007 | Chatterjee | |
| 7,363,367 B2 | 4/2008 | Lloyd et al. | |
| 8,433,681 B2 | 4/2013 | Patel et al. | |
| 8,433,849 B2 | 4/2013 | De Schrijver et al. | |
| 8,510,267 B2 | 8/2013 | Barton et al. | |
| 8,527,458 B2 | 9/2013 | Park et al. | |
| 8,935,211 B2 * | 1/2015 | Orenstein | G06F 17/30 707/646 |
| 2005/0198451 A1 * | 9/2005 | Kano | G06F 3/0619 711/162 |
| 2006/0069862 A1 * | 3/2006 | Kano | G06F 3/0605 711/114 |

(Continued)

FOREIGN PATENT DOCUMENTS

WO    2008/112779 A2    9/2008

*Primary Examiner* — Kris Mackes

(74) *Attorney, Agent, or Firm* — Hall Estill Attorneys at Law

(57) ABSTRACT

Apparatus and method for updating map structures in an object storage system. A server communicates with users of an object storage system over a network. A plurality of data storage devices are arranged into locations to store and retrieve data objects of the users. A storage controller is associated with each location to direct data object transfers between the data storage devices of the associated location and the server using an existing map structure that describes the data objects in each location. A management module is adapted to generate a new map structure, migrate at least one data object from an existing location described by the existing map structure to a new location described by the new map structure, and to distribute the new map structure to each of the storage controllers after the migration of the at least one data object.

20 Claims, 6 Drawing Sheets

(56) References Cited

U.S. PATENT DOCUMENTS

| | | | |
|---|---|---|---|
| 2010/0205370 A1* | 8/2010 | Ikawa | G06F 3/0625 711/114 |
| 2012/0233134 A1 | 9/2012 | Barton et al. | |
| 2013/0226978 A1 | 8/2013 | Bestler et al. | |

* cited by examiner

UPDATING MAP STRUCTURES IN AN OBJECT STORAGE SYSTEM

SUMMARY

Various embodiments of the present disclosure are generally directed to an apparatus and method for updating map structures in an object storage system, such as a cloud computing environment.

In accordance with some embodiments, a proxy server communicates with users of the object storage system over a computer network. A plurality of data storage devices have associated memory to store and retrieve data objects of the users. The data storage devices are arranged into a plurality of locations within the object storage system. A storage controller is associated with each location to direct data transfers between the data storage devices of the associated location and the proxy server using an existing map structure that describes the data objects in each location. A management module is adapted to generate a new map structure, migrate at least one data object from a first location described by the existing map structure to a second location described by the new map structure, and to distribute the new map structure to each of the storage controllers after the migration of the at least one data object.

DETAILED DESCRIPTION

Figure 1:
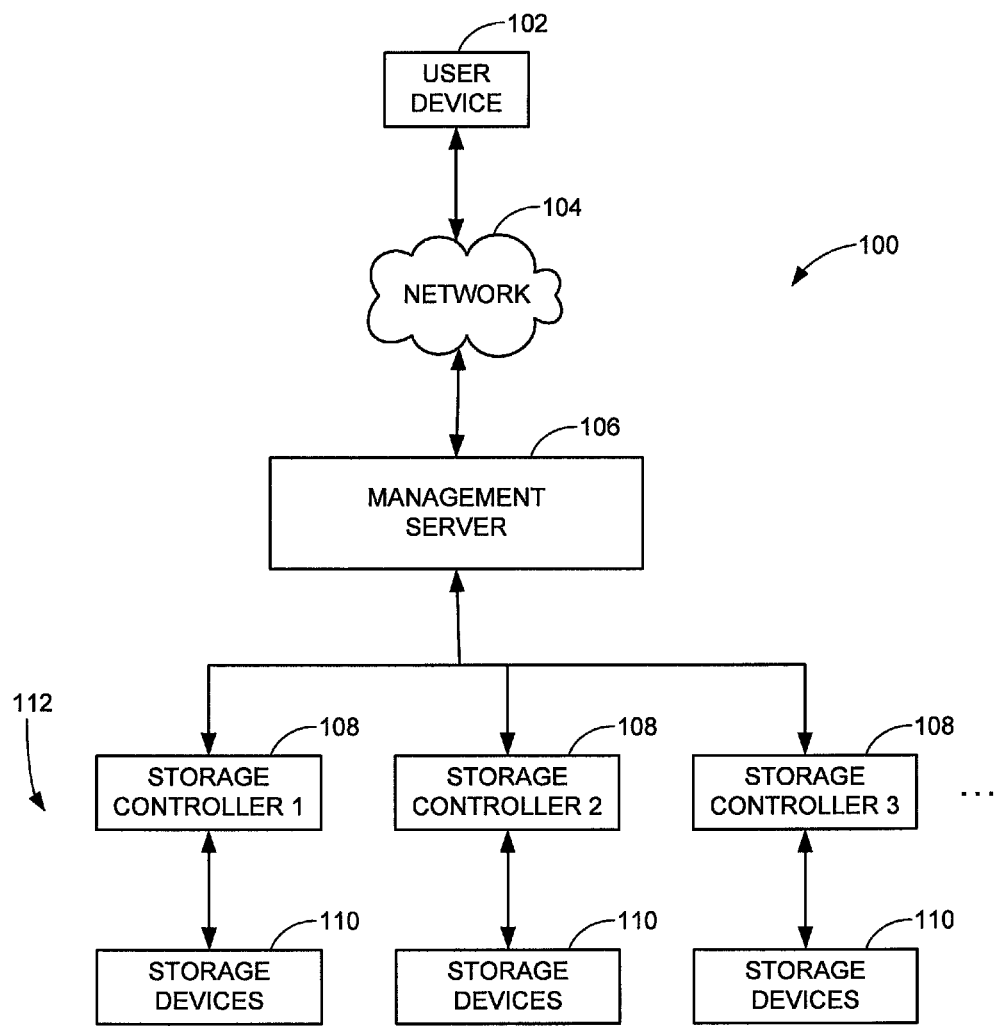
FIG. 1 is a functional representation of an object storage system configured and operated in accordance with various embodiments of the present disclosure.

The present disclosure generally relates to the migration of data in an object storage system, such as in a cloud computing environment.

Cloud computing generally refers to a network-based distributed data processing environment. Network services such as computational resources, software and/or data are made available to remote users via a wide area network, such as but not limited to the Internet. A cloud computing network can be a public "available-by-subscription" service accessible by substantially any user for a fee, or a private "in-house" service operated by or for the use of one or more dedicated users.

A cloud computing network is generally arranged as an object storage system whereby data objects (e.g., files) from users ("account holders" or simply "accounts") are replicated and stored in storage locations within the system. Depending on the system configuration, the locations may be geographically distributed. The network may be accessed through web-based tools such as web browsers, and provides services to a user as if such services were installed locally on the user's local computer. Other tools can be used including command line tools, etc.

Object storage systems are often configured to be massively scalable so that new storage nodes, servers, software modules, etc. can be added to the system to expand overall capabilities in a manner transparent to the user. An object storage system can continuously carry out significant amounts of background overhead processing to store, replicate, migrate and rebalance the data objects stored within the system in an effort to ensure the data objects are available to the users at all times.

Various embodiments of the present disclosure are generally directed to advancements in the manner in which an object storage system deploys updated mapping within the system. As explained below, in some embodiments a server is adapted to communicate with users of the object storage system over a network. A plurality of data storage devices store and retrieve data objects from the users. The data storage devices are arranged into a plurality of locations (e.g., zones) each corresponding to a different physical location within the distributed object storage system and having an associated storage controller. Map structures are used to associate storage entities such as the data objects with physical locations within the data storage devices.

A map management module is adapted to generate a new map structure, migrate at least one data object from a first storage location described by the existing map structure to a second storage location described by the new map structure, and then deploy (distribute) the new map structure to each of the storage controllers. Thereafter, the storage controllers use the new map structure to direct data object transfer operations between the respective locations and the server.

In some cases, the map structures are referred to as rings, and the rings are arranged as an account ring, a container ring and an object ring. The account ring provides lists of containers, or groups of data objects owned by a particular user ("account"). The container ring provides lists of data objects in each container, and the object ring provides lists of data objects mapped to their particular storage locations. Other forms of map structures can be used.

By migrating the data prior to deployment of the new map structures, the system will be substantially up to date at the time of deployment and the data objects in the system will nominally match the new map structures. This can reduce system disturbances by substantially eliminating the need for system services to react and perform large scale data migrations to conform the system to the newly deployed maps. In this way, the data objects can be quickly and efficiently migrated to the new mapping in the background without substantively affecting user data access operations or overhead processing within the system.

These and various other features of various embodiments disclosed herein can be understood beginning with a review of FIG. 1 which illustrates an object storage system 100. It is contemplated that the system 100 is operated as a subscription-based or private cloud computing network, although such is merely exemplary and not necessarily limiting.

The system 100 is accessed by one or more user devices 102, which may take the form of a network accessible device such as a desktop computer, a terminal, a laptop, a tablet, a smartphone, a game console or other device with network connectivity capabilities. In some cases, each user device 102 accesses the system 100 via a web-based application on the user device that communicates with the system 100 over a network 104. The network 104 may take the form of the Internet or some other computer-based network.

The system 100 includes various elements that may be geographically distributed over a large area. These elements include one or more management servers 106 which process communications with the user devices 102 and perform other system functions. A plurality of storage controllers 108 control local groups of storage devices 110 used to store data objects from the user devices 102 as requested, and to return the data objects as requested. Each grouping of storage devices 110 and associated controller 108 is characterized as a storage node 112.

While only three storage nodes 112 are illustrated in FIG. 1, it will be appreciated that any number of storage nodes can be provided in, and/or added to, the system. It is contemplated that each storage node constitutes one or more zones. Each zone is a physically separated storage location configured to be isolated from other zones to the degree that a service interruption event, such as a loss of power, that affects one zone will not likely affect another zone. A zone can take any respective size such as an individual storage device, a group of storage devices, a server cabinet of devices, a group of server cabinets or an entire data center. The system 100 is scalable so that additional controllers and/or storage devices can be added to expand existing zones or add new zones (or other locations) to the system. Any number of hierarchies can be used, such as from smallest to largest (e.g. device, node, zone, region, etc.).

Generally, data presented to the system 100 by the users of the system are organized as data objects, each constituting a cohesive associated data set (e.g., a file) having an object identifier (e.g., a "name"). Examples include databases, word processing and other application files, graphics, A/V works, web pages, games, executable programs, etc. Substantially any type of data object can be stored depending on the parametric configuration of the system.

Each data object presented to the system 100 will be subjected to a system replication policy so that multiple copies of the data object are stored in different zones. It is contemplated albeit not required that the system nominally generates and stores three (3) replicas of each data object. This enhances data reliability, but generally increases background overhead processing to maintain the system in an updated state.

Figure 2:
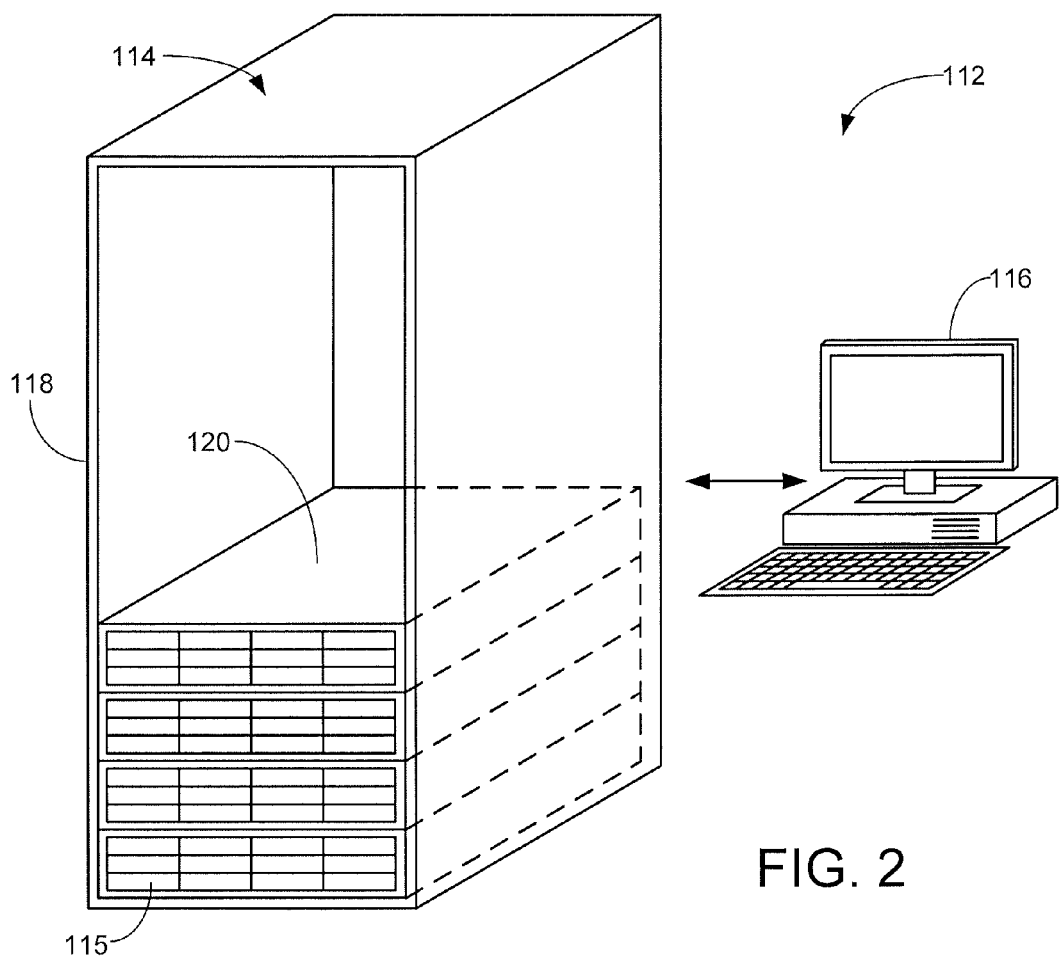
FIG. 2 illustrates a storage controller and associated storage elements from FIG. 1 in accordance with some embodiments.

An example hardware architecture for portions of the system 100 is represented in FIG. 2. Other hardware architectures can be used. Each storage node 112 from FIG. 1 includes a storage assembly 114 and a computer 116. The storage assembly 114 may include one or more server cabinets (racks) 118 with a plurality of modular storage enclosures 120. In some cases, multiple zones may be defined in a single rack, multiple racks may constitute the same zone, etc.

The storage rack 118 is a 42 U server cabinet with 42 units (U) of storage, with each unit extending about 1.75 inches (in) of height. The width and length dimensions of the cabinet can vary but common values may be on the order of about 24 in.×36 in. Each storage enclosure 120 can have a height that is a multiple of the storage units, such as 2 U (3.5 in.), 3 U (5.25 in.), etc.

In some cases, the functionality of the storage controller 108 can be carried out using the local computer 116. In other cases, the storage controller functionality carried out by processing capabilities of one or more of the storage enclosures 120, and the computer 116 can be eliminated or used for other purposes such as local administrative personnel access. In one embodiment, each storage node 112 from FIG. 1 incorporates four adjacent and interconnected storage assemblies 114 and a single local computer 116 arranged as a dual (failover) redundant storage controller.

Figure 3:
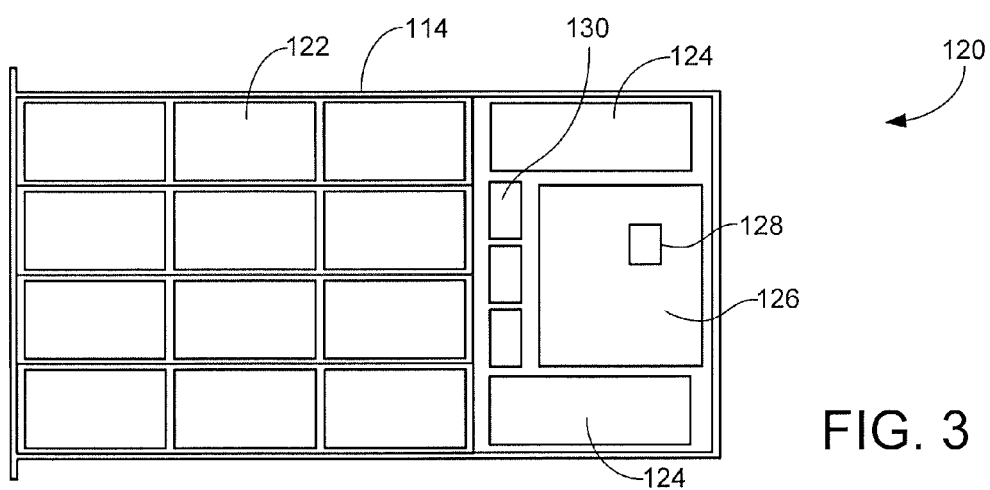
FIG. 3 shows a selected storage element from FIG. 2.

An example configuration for a selected storage enclosure 120 is shown in FIG. 3. The enclosure 120 incorporates 36 (3×4×3) data storage devices 122. Other numbers of data storage devices 122 can be incorporated into each enclosure. The data storage devices 112 can take a variety of forms, such as hard disc drives (HDDs), solid-state drives (SSDs), hybrid drives (Solid State Hybrid Drives, SDHDs), etc. Each of the data storage devices 112 includes associated storage media to provide main memory storage capacity for the system 100. Individual data storage capacities may be on the order of about 4 terabytes, TB ($4 \times 10^{12}$ bytes), per device, or some other value. Devices of different capacities, and/or different types, can be used in the same node and/or the same enclosure. Each storage node 112 can provide the system 100 with several petabytes, PB ($10^{15}$ bytes) of available storage, and the overall storage capability of the system 100 can be several exabytes, EB ($10^{18}$ bytes) or more.

In the context of an HDD, the storage media may take the form of one or more axially aligned magnetic recording discs which are rotated at high speed by a spindle motor. Data transducers can be arranged to be controllably moved and hydrodynamically supported adjacent recording surfaces of the storage disc(s). While not limiting, in some embodiments the storage devices 122 are 3½ inch form factor HDDs with nominal dimensions of 5.75 in×4 in×1 in.

In the context of an SSD, the storage media may take the form of one or more flash memory arrays made up of non-volatile flash memory cells. Read/write/erase circuitry can be incorporated into the storage media module to effect data recording, read back and erasure operations. Other forms of solid state memory can be used in the storage media including magnetic random access memory (MRAM), resistive random access memory (RRAM), spin torque transfer random access memory (STRAM), phase change memory (PCM), in-place field programmable gate arrays (FPGAs), electrically erasable electrically programmable read only memories (EEPROMs), etc.

In the context of a hybrid (SDHD) device, the storage media may take multiple forms such as one or more rotatable recording discs and one or more modules of solid state non-volatile memory (e.g., flash memory, etc.). Other configurations for the storage devices 122 are readily contemplated, including other forms of processing devices besides devices primarily characterized as data storage devices, such as computational devices, circuit cards, etc. that at least include computer memory to accept data objects or other system data.

The storage enclosures 120 include various additional components such as power supplies 124, a control board 126 with programmable controller (CPU) 128, fans 130, etc. to enable the data storage devices 122 to store and retrieve user data objects.

Figure 4:
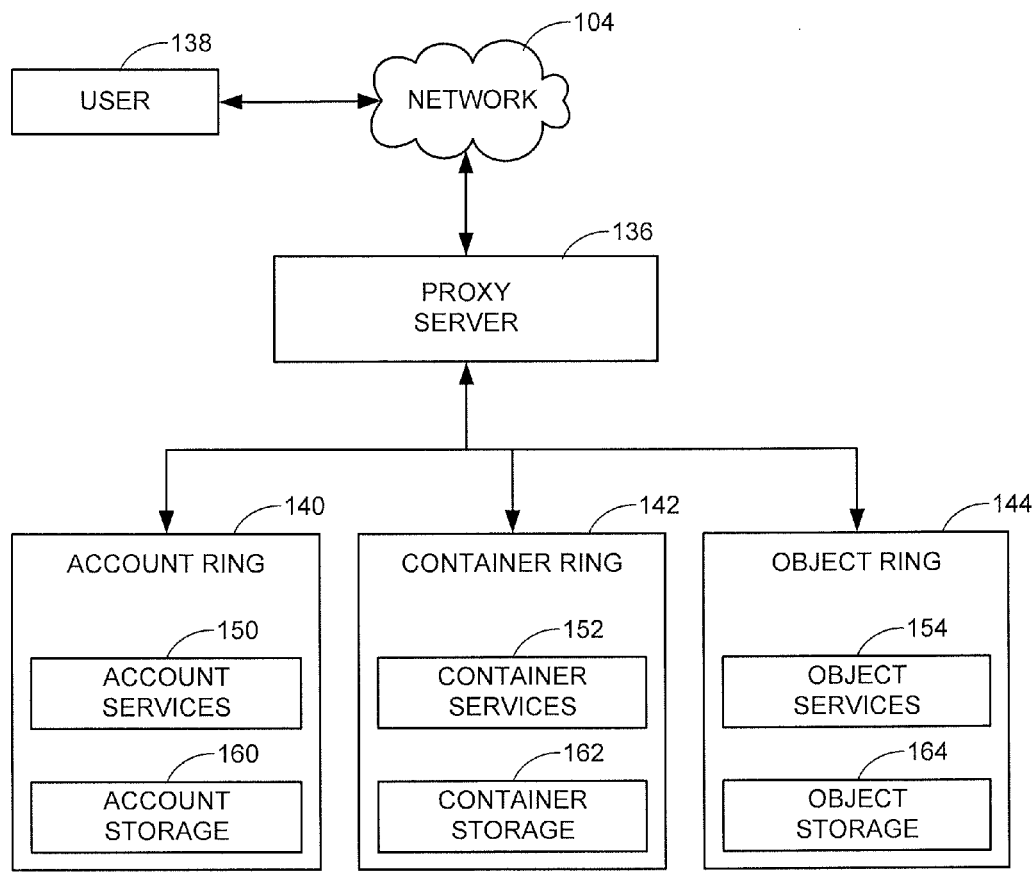
FIG. 4 is a functional representation of an exemplary architecture of the object storage system of FIG. 1.

An example software architecture of the system 100 is represented by FIG. 4. As before, the software architecture set forth by FIG. 4 is merely illustrative and is not limiting. A proxy server 136 may be formed from the one or more management servers 106 in FIG. 1 and operates to handle overall communications with users 138 of the system 100 via the network 104. It is contemplated that the users 138 communicate with the system 100 via the user devices 102 discussed above in FIG. 1.

The proxy server 136 accesses a plurality of map structures, or rings, to control data flow to the respective data storage devices 112 (FIG. 3). The map (ring) structures include an account ring 140, a container ring 142 and an object ring 144. Other forms of rings can be incorporated into the system as desired. Generally, each ring is a data structure that maps different types of entities to locations of physical storage. Each ring generally takes the same overall format, but incorporates different hierarchies of data. The rings may be stored in computer memory and accessed by an associated processor during operation.

The account ring 140 provides lists of containers, or groups of data objects owned by a particular user ("account"). The container ring 142 provides lists of data objects in each container, and the object ring 144 provides lists of data objects mapped to their particular storage locations.

Each ring 140, 142, 144 has an associated set of services 150, 152, 154 and storage 160, 162, 164. The storage may or may not be on the same devices. The services and storage enable the respective rings to maintain mapping using zones, devices, partitions and replicas. The services may be realized by software, hardware and/or firmware. In some cases, the services are software modules representing programming executed by an associated processor of the system.

As discussed previously, a zone is a physical set of storage isolated to some degree from other zones with regard to disruptive events. A given pair of zones can be physically proximate one another, provided that the zones are configured to have different power circuit inputs, uninterruptible power supplies, or other isolation mechanisms to enhance survivability of one zone if a disruptive event affects the other zone. Contrawise, a given pair of zones can be geographically separated so as to be located in different facilities, different cities, different states and/or different countries.

Devices refer to the physical devices in each zone. Partitions represent a complete set of data (e.g., data objects, account databases and/or container databases) and serve as an intermediate "bucket" that facilitates management locations of the data objects within the cluster. Data may be replicated at the partition level so that each partition is stored three times, one in each zone. The rings further determine which storage devices are used to service a particular data access operation and which devices should be used in failure handoff scenarios.

In at least some cases, the object services block 154 can include an object server arranged as a relatively straightforward blob server configured to store, retrieve and delete objects stored on local storage devices. The objects are stored as binary files on an associated file system. Metadata may be stored as file extended attributes (xattrs). Each object is stored using a path derived from a hash of the object name and an operational timestamp. Last written data always "wins" in a conflict and helps to ensure that the latest object version is returned responsive to a user or system request. Deleted objects are treated as a 0 byte file ending with the extension ".ts" for "tombstone." This helps to ensure that deleted files are replicated correctly and older versions do not inadvertently reappear in a failure scenario.

The container services block 152 can include a container server which processes listings of objects in respective containers without regard to the physical locations of such objects. The listings may be as SQLite database files or some other form, and are replicated across a cluster similar to the manner in which objects are replicated. The container server may also track statistics with regard to the total number of objects and total storage usage for each container.

The account services block 150 may incorporate an account server that functions in a manner similar to the container server, except that the account server maintains listings of containers rather than objects. To access a particular data object, the account ring 140 may be consulted to identify the associated container(s) for the account, the container ring 142 may be consulted to identify the associated data object(s), and the object ring 144 may be consulted to locate the various copies in physical storage. Alternatively, as discussed above the account and container identifications may be supplied as arguments and the object is identified directly. Regardless, the user input specifies one or more data objects, and commands are issued to the appropriate storage node 112 (FIGS. 2-3) to retrieve the requested data objects.

Figure 5:
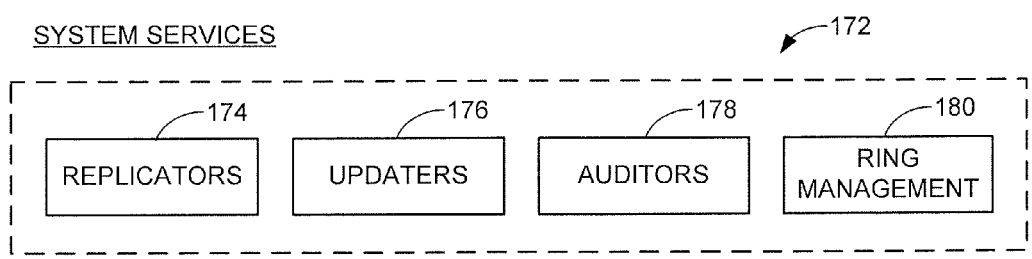
FIG. 5 is a functional representation of selected services used by the system architecture of FIG. 4 in accordance with some embodiments.

Additional services 172 incorporated by or used in conjunction with the account, container and ring services 150, 152, 154 are represented in FIG. 5. The services 172 in FIG. 5 may be realized as software, hardware and/or firmware. In some cases, the services represent programming steps stored in memory and executed by one or more programmable processors of the system.

The system services 172 can include include replicators 174, updaters 176, auditors 178 and a ring management module 180. Generally, the replicators 170 attempt to maintain the system in a consistent state by comparing local data with each remote copy to ensure all are at the latest version. Object replication can use a hash list to quickly compare subsections of each partition, and container and account replication can use a combination of hashes and other data as desired.

The updaters 176 attempt to correct out of sync issues due to failure conditions or periods of high loading when updates cannot be timely serviced. The auditors 178 crawl the local system checking the integrity of objects, containers and accounts. If an error is detected with a particular entity, the entity is quarantined and other services are called to rectify the situation.

Figure 6:
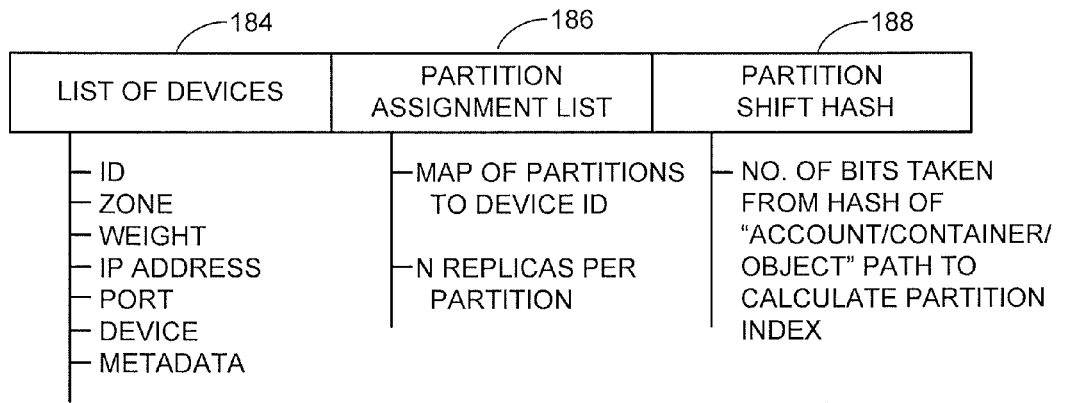
FIG. 6 shows an exemplary format for the map (ring) structures of FIG. 4.

The ring management module 180 operates to process updates to the map (ring) structures. FIG. 6 provides an exemplary format for a selected map data structure 182. While not necessarily limiting, the format of FIG. 6 can be utilized by each of the account, container and object rings 140, 142, 144 of FIG. 4.

The map data structure 182 is shown to include three primary elements: a list of devices 184, a partition assignment list 186 and a partition shift hash 188. The list of devices (devs) 184 lists all data storage devices 122 that are associated with, or that are otherwise accessible by, the associated ring, as shown in Table 1.

TABLE 1

| Data Value | Type | Description |
| --- | --- | --- |
| ID | Integer | Index of the devices list |
| ZONE | Integer | Zone in which the device resides |
| WEIGHT | Floating | Relative weight of the device capacity |
| IP ADDRESS | String | IP address of storage controller of device |
| TCP PORT | Integer | TCP port for storage controller of device |
| DEVICE | String | Device name |
| METADATA | String | General use field for control information |

Generally, ID provides an index of the devices list by device identification (ID) value. ZONE indicates the zone in which the data storage device is located. WEIGHT indicates a relative weight factor of the storage capacity of the device relative to other storage devices in the system. For example, a 2 TB (terabyte, $10^{12}$ bytes) drive may be given a weight factor of 2.0, a 4 TB drive may be given a weight factor of 4.0, and so on.

IP ADDRESS is the IP address of the storage controller associated with the device. TCP PORT identifies the TCP port the storage controller uses to serve requests for the device. DEVICE is the name of the device within the host system, and is used to identify the disk mount point. META-DATA is a general use field that can be used to store various types of arbitrary information as needed.

The partition assignment list 186 generally maps partitions to the individual devices. This data structure is a nested list: N lists of M+2 elements, where N is the number of replicas for each of M partitions. In some cases, the list 186 may be arranged to list the device ID for the first replica of each M partitions in the first list, the device ID for the second replica of each M partitions in the second list, and so on. The number of replicas N is established by the system administrators and may be set to three (e.g., N=3) or some other value. The number of partitions M is also established by the system administrators and may be a selected power of two (e.g., $M=2^{20}$, etc.).

The partition shift value 188 is a number of bits taken from a selected hash of the "account/container/object" path to provide a partition index for the path. The partition index may be calculated by translating a binary portion of the hash value into an integer number.

Figure 7:
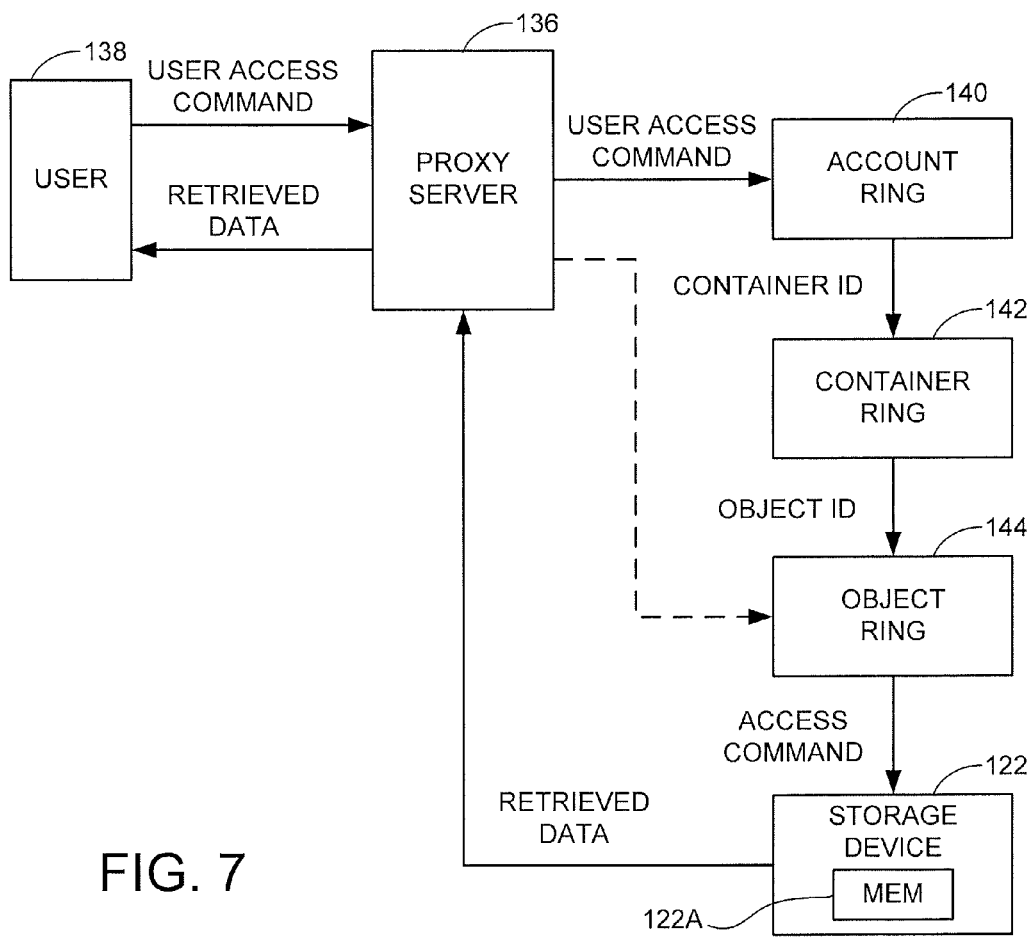
FIG. 7 is a functional block representation of read access command processing by the system architecture of FIG. 4.

FIG. 7 shows a processing sequence by the system architecture of FIG. 4 to service an access command from a user 138 (via a user device 102, FIG. 1). A user access command is issued to the proxy server 136 to request a selected data object. In some embodiments, the command may be in the form of a URL such as https://swift.example-.com/v1/account/container/object, so that the user supplies account, container and/or object information in the request. The account, container and/or object rings 140, 142, 144 may be referenced by the proxy server 136 to identify the particular storage device 122 (FIG. 3) from which the data object should be retrieved. In some cases, the user supplies account and container information as arguments and the account ring is referenced directly to locate the desired object(s), so that the account and container rings are not normally referenced during access operations (as indicated by a dotted line path in FIG. 7).

The access command is forwarded to the associated storage node, and the local storage controller 108 schedules a read operation upon the storage memory (mem) 122A of the associated storage device(s) 122. In some cases, system services may determine which replicated set of the data should be accessed to return the data. The data objects (retrieved data) are returned from the associated device and forwarded to the proxy server which in turn forwards the requested data to the user device 138.

Figure 8:
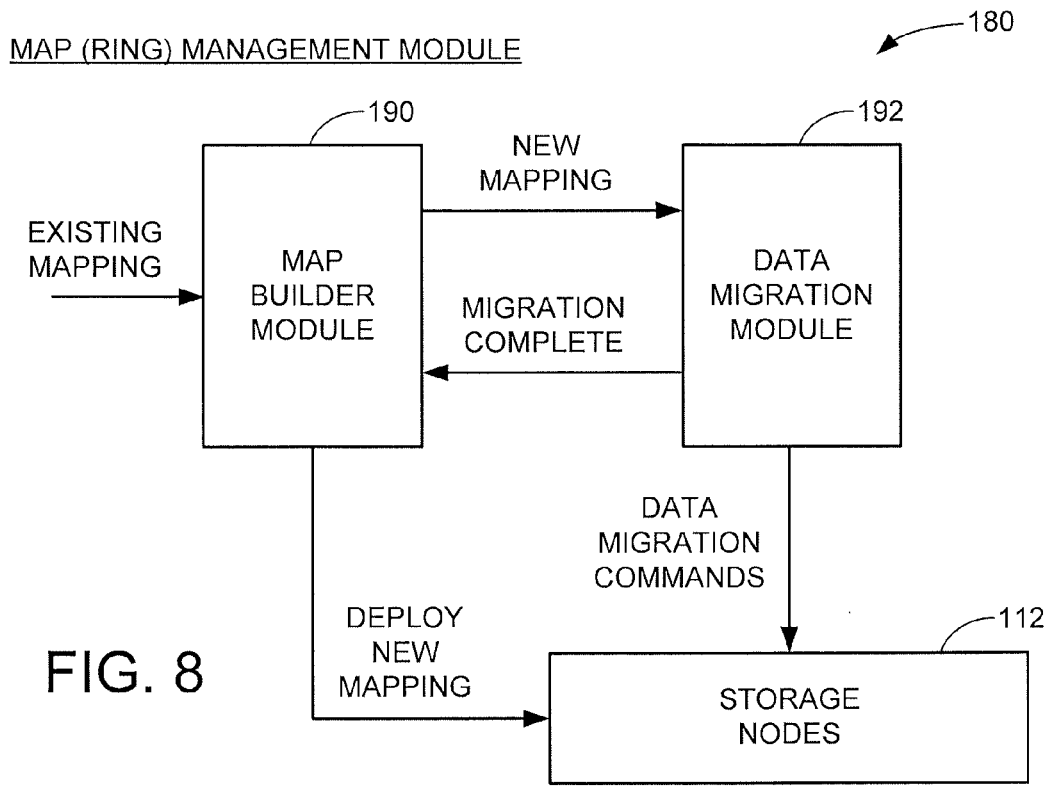
FIG. 8 illustrates a ring manager of the system of FIG. 1 in accordance with some embodiments.

FIG. 8 is a functional representation of the map (ring) management module 180 of FIG. 5 as set forth by some embodiments. Generally, the map management module 180 operates to generate new map structures, direct the migration of data among the various storage nodes to conform the storage to the new mapping, and then deploy the new mapping to the various storage nodes. Each storage node will have a copy of all mapping of the system. The new mapping may arise from a variety of situations, such as the addition of new storage capacity to the system, the rebalancing of the rings to better level load the existing data within the system, the addition of sufficient amounts of new data to the system requiring updated map structures, and so on.

It will be noted that the data are migrated prior to the deployment (dissemination or promulgation) of the new map structures so that when the new map structures are promulgated to the various servers, the data objects will already be stored in locations that substantially conform to the newly promulgated maps. In this way, other resources of the system such as set forth in FIG. 5 will not undergo significant operations in an effort to migrate the data and conform the system to the new mapping. Issues such as maintaining the ability to continue to service ongoing access commands (as in FIG. 7) during the data migration process are readily handled by the module 180. It is contemplated that all of the map structures (account, container and object) may be updated concurrently, but in some cases only a subset of these map structures may require updating (e.g., only the object ring, etc.).

As shown in FIG. 8, the map management module 180 includes a map (ring) builder module 190 and a data migration module 192. At such time that the map management module 180 determines that one or more new map structures are required, the map builder module 190 obtains a copy of the latest version of the then-existing map structure ("existing mapping"). In some cases, the map structures are stored (and replicated) among the various zones along with the other entities in the system. It is contemplated albeit not necessarily required that every storage node 112 will have a full set of all map structures utilized by the system. Accordingly, the map builder module 190 may request the existing mapping from a selected one of the storage nodes 112, from a central repository, etc.

Figure 9:
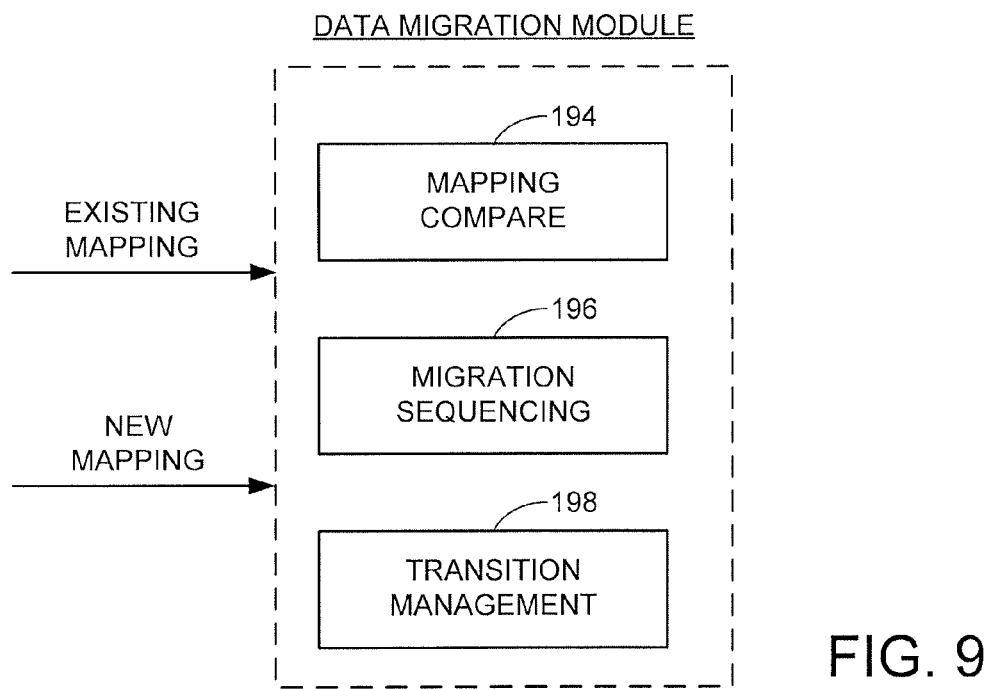
FIG. 9 depicts aspects of the data migration module of FIG. 8 in accordance with some embodiments.

The map builder module 190 proceeds to generate a new map structure ("new mapping"), and supplies such to the data migration module 192. The map builder module 190 may further supply the existing mapping to the data migration module 192. As further depicted in FIG. 9, a mapping compare block 194 of the data migration module 192 determines which data objects require migration. This can be carried out in a variety of ways, but will generally involve a comparison between the existing mapping and the new mapping. At this point, it will be appreciated that the new mapping remains localized and has not yet been deployed to all storage nodes.

A migration sequencing block 196 schedules and directs the migration of data objects within the storage nodes 112 to conform the data storage state to the new mapping. This may include the issuance of various data migration commands to the respective storage nodes 112 in the system, as represented in FIG. 8.

In response to the data migration commands, various data objects may be read, temporarily stored, and rewritten to different ones of the various storage devices 112 in the storage nodes. It is contemplated that at least some of the migrated data objects will be migrated from one zone to the next. The migration sequencing block 196 may receive command complete status indications from the nodes signifying the status of the ongoing data migration effort.

It will be noted that while the data are being migrated, the data state will be intentionally placed in a condition where it deviates from the existing map structures of the respective nodes. In some cases, a transition management block 198 may communicate with other services of the system (e.g., the replicators 174, updaters 176, auditors 178, etc. of FIG.

5) to suspend the operation of these and other system/ring services to not attempt to "undo" the migrations. An exception list, for example, may be generated and issued for certain data objects so that, should one or more of these services identify a mismatch between the existing mapping and the actual locations of the respective data objects, no corrective action will be taken. In other cases, the storage nodes affected by the data migrations may be temporarily marked as "off limits" for actions by these and other services until the completion of the migration. In still further embodiments, a special data migration command may be issued so that the storage controllers are "informed" that the migration commands are in anticipation of new mapping and therefore are intentionally configured to "violate" the existing mapping.

Once the data migration is complete, a migration complete status may be generated by the data migration module 192 and forwarded to the map builder module 190 as indicated in FIG. 8. Upon receipt of the migration complete status, the map builder module 190 deployed the new mapping by forwarding new map structures to the various storage nodes in the system. At this point the data state of the system should nominally match that of the new map structures, and little if any additional overhead processing should be required by other system services (see e.g, FIG. 5) to ensure conformance of the system to the newly deployed map structure(s).

Another issue that may arise from this processing is the handling of data access commands as in FIG. 7 during the data migration process. That is, while it is expected that the processing of FIG. 8 should often be completed in a relatively short period of time, it is contemplated that a data access command may be received from a user for data objects affected by the data migration carried out by the data migration module 192.

In such case, the migration sequencing block 196 may be configured to intelligently select the order in which data objects are migrated and/or tombstoned during the migration process. As the system maintains multiple replicas of every set of data objects (e.g., N=3), in some cases at least one set of data objects are maintained in an existing mapping structure so that data access commands can be issued to those replica sets of the data objects not affected by the migration. In some cases, these pristine replicas can be denoted as "source" replicas so that any access commands received during the data migration process are serviced from these replicas.

Additionally or alternatively, a temporary translation table can be generated so that, should the objects not be found using the existing mapping, the translation table can be consulted and a copy of the desired data objects can be returned from a cached copy and/or from the new location indicated by the new mapping.

Figure 10:
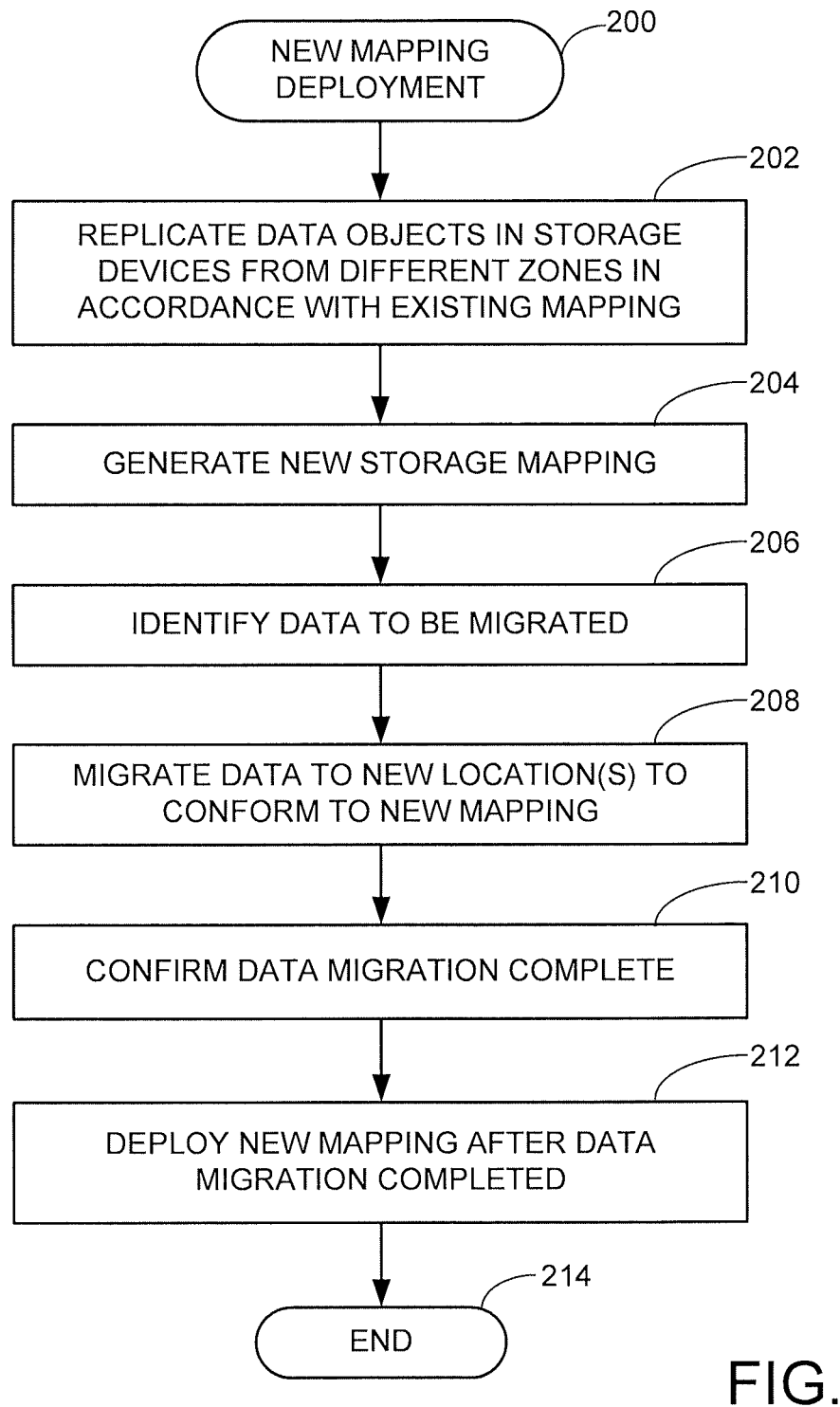
FIG. 10 is a NEW MAPPING DEPLOYMENT routine carried out by the system of FIG. 1 in accordance with some embodiments.

FIG. 10 provides a flow chart for a NEW MAPPING DEPLOYMENT routine 200, generally illustrative of steps carried out in accordance with the foregoing discussion. It will be appreciated that the routine 200 is merely exemplary and is not limiting. The various steps shown in FIG. 10 can be modified, rearranged in a different order, omitted, and other steps can be added as required.

At step 202, various data objects supplied by users 138 of the system 100 are replicated in storage devices 122 housed in different locations (e.g., zones) in accordance with an existing mapping structure. The existing mapping structure may include the account, container and object rings 140, 142, 144 discussed above having a format such as set forth in FIG. 6.

At some point during the operation of the system 100, a new map structure is generated as indicated at step 204. This will be carried out by the map builder module 190 of FIG. 8 using the existing map structure.

The data objects that require migration to conform the system to the new map structure are identified at step 206. This may be carried out by the data migration module 192 of FIG. 8, including through the use of the mapping compare block 194 of FIG. 9. The identified data objects are migrated to one or more new locations at step 208, such as through the use of the migration sequencing block 196 of FIG. 9.

Although not shown in FIG. 10, user data access commands received during this processing are serviced as discussed above, with the possible use of temporary transition tables to enable the system to locate and return the desired data objects. New data objects presented for storage during the data transition may be stored in an available location, or may be temporarily cached pending completion of the data migration process. Existing system services that normally detect (and attempt to correct) discrepancies between the existing map structures and the actual locations of the objects may be suspended or otherwise instructed to hold off making changes to noted discrepancies.

Once the data migration is confirmed as being completed, step 210, the new map structures are deployed to the various storage nodes and other locations throughout the system at step 212, after which the process ends at step 214. This can be carried out automatically or manually by system operators. For example, the system can notify the system operators that the data migration (including a substantial portion thereof) has been completed, and the system operators can thereafter direct the deployment of the data to the various locations in the system.

The systems embodied herein are suitable for use in cloud computing environments as well as a variety of other environments. Data storage devices in the form of HDDs, SSDs and SDHDs have been illustrated but are not limiting, as any number of different types of media and operational environments can be adapted to utilize the embodiments disclosed herein It is to be understood that even though numerous characteristics and advantages of various embodiments of the present disclosure have been set forth in the foregoing description, together with details of the structure and function of various embodiments thereof, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An object storage system comprising:
a server adapted to communicate with users of the object storage system over a network;
a plurality of data storage devices which store and retrieve data objects of the users and which are arranged into a plurality of locations;
a storage controller circuit associated with each location to direct data transfers between the associated data storage devices and the server using an existing map structure stored in a first memory that describes the data objects in each location, the existing map structure comprising a list of devices corresponding to the data storage devices, a partition assignment list to map partitions of data objects to the devices, and a partition shift hash; and a management circuit adapted to generate a new map structure in a second memory, migrate at least one data object from a first location described by the existing map structure to a second location described by the new map structure, and to distribute the new map structure to each of the storage controller circuits responsive to a data migration complete signal indicating successful completion of the migration of the at least one data object so that no additional migrations are necessary to conform the data objects in each location to the new map structure.

2. The object storage system of claim 1, wherein responsive to the distribution of the new map structure by the management module to each of the storage controller circuits, each of the storage controller circuits subsequently directs data transfers between the data storage devices of the associated location and the server using the new map structure.

3. The object storage system of claim 1, wherein the management circuit comprises a map builder circuit adapted to generate the new map structure and a data migration circuit adapted to migrate data objects to different locations to conform the data objects stored by the data storage devices to the new map structure.

4. The object storage system of claim 3, wherein the data migration circuit comprises a mapping compare block circuit which identifies a set of data objects requiring migration to conform to the new map structure, and a migration sequencing block circuit which issues a succession of data migration commands to the storage controller circuits to migrate the set of data objects to conform to the new map structure, wherein the data migration circuit generates the data migration complete signal responsive to completion of the migration of the at least one data object, and wherein the map builder circuit transfers a copy of the new map structure responsive to the data migration complete status signal from the data migration circuit.

5. The object storage system of claim 1, further comprising a plurality of services stored in a memory and realized as programming executed by one or more associated processors to identify discrepancies between storage locations of the data objects within the data storage devices and the existing map structure, and wherein the management circuit temporarily suspends operation of the plurality of services during the migration of at least one data object from an existing location described by the existing map structure to a new location described by the new map structure.

6. The object storage system of claim 1, wherein the map structure comprises at least a selected one of an account ring, a container ring or an object ring, wherein the account ring identifies containers of data objects owned by an account, the container ring identifies objects in each container, and the object ring identifies physical locations of the data objects in the respective data storage devices.

7. The object storage system of claim 1, wherein the data storage devices comprise solid state drives (SSDs).

8. The object storage system of claim 1, characterized as a cloud computing environment.

9. An object storage system comprising:
a proxy server adapted to communicate with users of the distributed object storage system over a computer network;
a plurality of storage nodes each comprising a plurality of data storage devices having associated memory to store and retrieve data objects of the users and a storage node controller circuit adapted to communicate with the proxy server;
existing map structures realized by programming in a memory accessible by a programmable processor, the existing map structures comprising an account ring, a container ring and an object ring, wherein the account ring identifies containers of data objects owned by a user of the system, the container ring identifies data objects in each container, and the object ring identifies physical locations of the data objects in the plurality of data storage devices, each respective one of the existing map structures stored in a different local memory utilized by a corresponding one of the storage node controller circuits; and
a management module circuit realized by programming in a memory and executed by a programmable processor to generate a new map structure to replace the existing map structures, to migrate at least one data object from a first location described by the existing map structures to a second location described by the new map structure, and to distribute copies of the new map structure to each of the local memories utilized by the storage controller circuits after the migration of the at least one data object responsive to receipt of a data migration complete signal indicating successful completion of the migration of the at least one data object so that no additional migrations are necessary to conform the data objects in each location to the new map structure, the new map structure comprising at least a selected one of a new account ring, a new container ring or a new object ring.

10. The object storage system of claim 9, wherein the management module circuit comprises a map builder module circuit adapted to generate the new map structure and a data migration module circuit adapted to migrate data objects to different locations to conform the data objects stored by the data storage devices to the new map structure.

11. The object storage system of claim 10, wherein the data migration module circuit comprises a mapping compare block circuit which identifies a set of data objects requiring migration to conform to the new map structure, and a migration sequencing block circuit which issues a succession of data migration commands to the storage controller circuit to migrate the set of data objects to conform to the new map structure, wherein the map builder module circuit transfers a copy of the new map structure responsive to the data migration complete status signal from the data migration module indicating that the set of data objects have been successfully migrated to new locations corresponding to the new map structure.

12. The object storage system of claim 9, further comprising a system service module circuit realized by programming in a memory executable by a programmable processor to identify discrepancies between storage locations of the data objects within the data storage devices and the existing map structure, and wherein the management module circuit temporarily suspends operation of the system service module circuit during the migration of at least one data object from an existing location described by the existing map structure to a new location described by the new map structure.

13. The object storage system of claim 9, wherein the object ring identifies a list of the data storage devices and the associated data objects stored therein.

14. The object storage system of claim 9, wherein the management module circuit further operates to generate a temporary transition table to facilitate servicing of access commands from users of the system to retrieve a data object that has been transitioned from an old location described by the existing map structure to a new location described by the new map structure.

15. A computer implemented method comprising:
    identifying an existing map structure that describes data objects stored in groups of data storage devices arranged into a plurality of different physical locations, each physical location having an associated storage controller circuit, a copy of the existing map structure stored in each of a plurality of local memories, each of the plurality of local memories associated with a different one of the storage controller circuits, the existing map structure comprising a list of devices corresponding to the data storage devices, a partition assignment list to map partitions of data objects to the devices, and a partition shift hash;
    generating a new map structure in a memory for the data objects which describes at least some of the data objects being stored in different ones of the groups of data storage devices;
    migrating the at least some of the data objects to different ones of the groups of data storage devices, using the storage controller circuits, to conform the groups of data storage devices to the new map structure after the generation of the new map structure; and
    distributing the new map structure to the respective storage controller circuits after the groups of data storage devices conform to the new map structure; and
    subsequently using the storage controller circuits to direct data transfer operations using the new map structure.

16. The computer implemented method of claim 15, wherein the generating a new map structure comprises comparing the existing map structure to the new map structure to identify the at least some of the data objects to be migrated to different ones of the groups of data storage devices.

17. The computer implemented method of claim 15, wherein the migrating the at least some of the data objects to different ones of the groups of data storage devices comprises issuing a succession of data migration commands to the storage controller circuits to migrate selected data objects to conform the groups of data storage devices to the new map structure, the data migration commands indicating changes to the locations of the selected data objects not reflected in the existing map structure.

18. The computer implemented method of claim 15, further comprising temporarily disabling, during the migration, a system service realized as programming executed by one or more associated processors to identify discrepancies between storage locations of the data objects within the data storage devices and the existing map structure.

19. The computer implemented method of claim 15, wherein the existing map structure comprises at least a selected one of an account ring, a container ring or an object ring, wherein the account ring identifies containers of data objects owned by an account, the container ring identifies objects in each container, and the object ring identifies physical locations of the data objects in the respective data storage devices.

20. The computer implemented method of claim 15, wherein the data migration complete signal indicates successful completion of the migration of the at least some of the data objects so that no additional migrations are necessary to conform the data objects in each location to the new map structure.

* * * * *